United States Patent Office 3,105,193
Patented Sept. 24, 1963

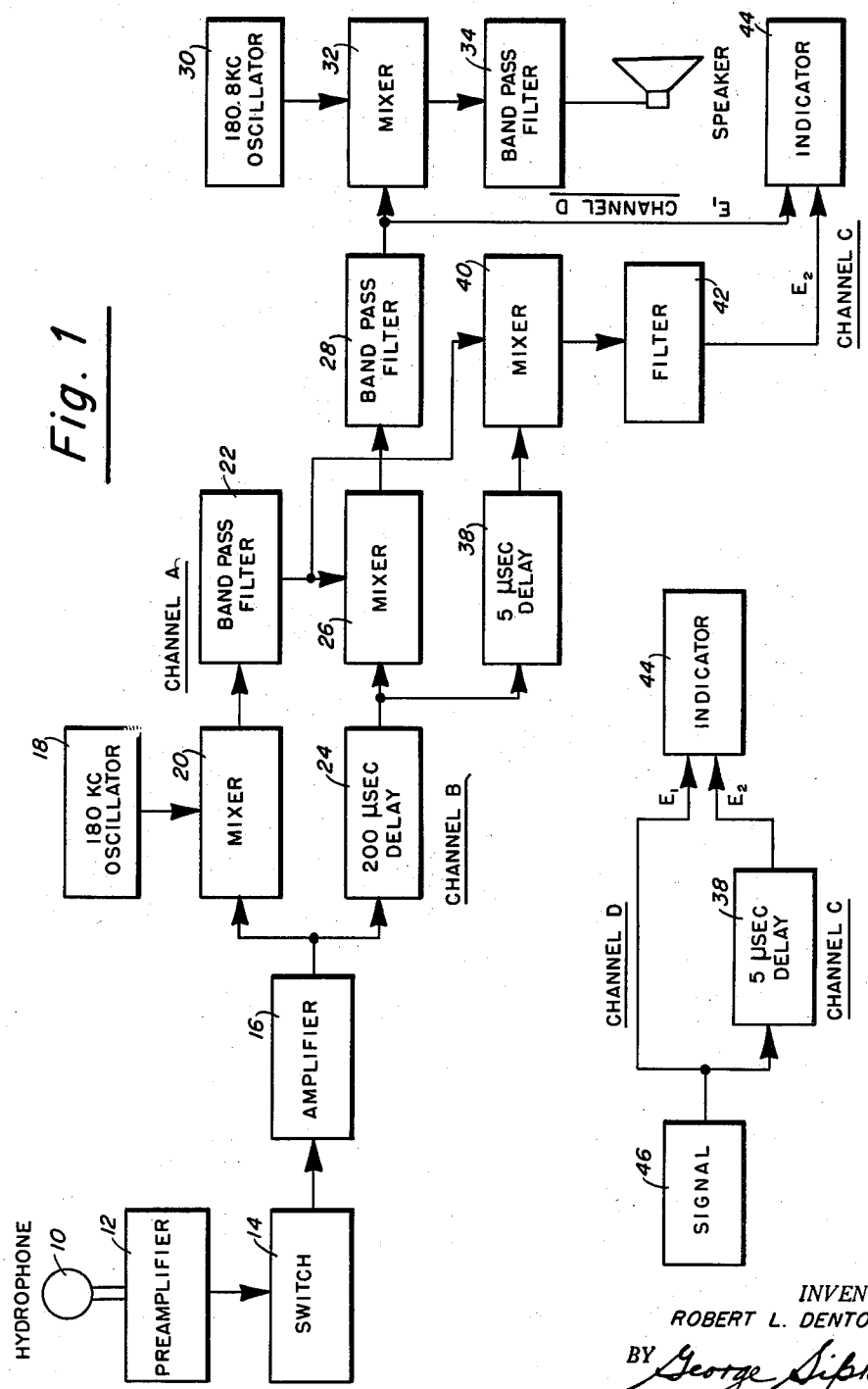

3,105,193
VISUAL FREQUENCY INDICATOR FOR BROAD BAND SONAR MONITOR
Robert L. Denton, 4431 Tivoli St., San Diego, Calif.
Filed Aug. 15, 1955, Ser. No. 528,568
6 Claims. (Cl. 324—82)
(Granted under Title 35, U.S. Code (1952), sec. 266)

The invention described herein may be manufactured and used by or for the Government of the United States of America for governmental purposes without the payment of any royalties thereon or therefor.

This invention relates to wave energy receivers and more particularly to a frequency indicator for such receivers.

In submarine warfare there is required for early detection of enemy sonar signals, a broadband sonar receiver capable of providing bearing, frequency and other information concerning the received signal. In such a broadband sonar receiver the heterodyne principle may be successfully employed at the expense of loss of signal frequency information. The use of a manually tunable rejection filter has been suggested to obtain frequency information. Such a filter, however, lacks accuracy and requires time consuming operation. The latter factor may result in total loss of frequency information when only one or two sonic pulses are received. There are no known frequency meters which are capable of measuring frequency of a signal of a duration on the order of 100 milliseconds or less.

The present invention provides an instantaneous visual frequency indication of a relatively short signal received by a receiver. The received signal is passed through two channels. The signal in one channel is fed through a delay line of known delay time whereby the phase of this signal is shifted relative to the phase of the signal in the other channel and in an amount proportional to received frequency. The two channels feed a phase detector which instantaneously indicates frequently as a function of phase difference.

An object of this invention is to provide means for indicating the frequency of a signal of short duration.

A further object of this invention is the provision of an indicator capable of instantaneously yielding frequency information.

A further object of this invention is the provision of a new and improved frequency meter for a broadband receiver for indicating frequency of a signal in terms of the shift in phase effected by a known time delay of the signal.

Still another object of the invention is to provide a frequency indicator for a broadband receiver which normally obscures the frequency of the detected signal.

Another object of this invention is to provide an instantaneous frequency indicator for a heterodyne correlating broad band sonar receiver.

Other objects and many of the attendant advantages of this invention will be readily appreciated as the same becomes better understood by reference to the following detailed description when considered in connection with the accompanying drawings wherein:

FIG. 1 is a block diagram of a receiver incorporating the frequency indicator of this invention; and FIG. 2 is a schematic representation of the principle of the invention.

Referring to FIG. 1, there is shown diagrammatically a sonar receiving system including a hydrophone 10 which may be of the multi-element omnidirectional type in which similar electromechanical transducer elements are disposed in a circular array to cover all or a selected part of the underwater horizon. For example, the hydrophone may comprise 36 similar elements each of which covers substantially 10° of the surrounding area. Signals from the individual elements of the hydrophone are fed through preamplifiers 12 and through individual cables to a switching unit 14 which may be manually operated to yield the desired receiving patterns. The switch unit is operable to connect selective ones or selective combinations of transducer elements to amplifier 16. Normally the switch arrangement corresponding to the omnidirectional pattern is used until detection is made. The signal bearing of the signal is localized to an area within the beam width of a single element. This method locates the bearing of a low duty cycle pulsed signal quickly without the loss in sensitivity incurred with rapid scanning methods.

The signal output from the switching unit is fed to a wide band amplifier 16 where all signals (such as from 5 to 100 kc.) are amplified. Automatic gain control may be provided in this amplifier for the normal omnidirectional listening. After amplification the signal is presented to two channels, A and B. In channel A the input signal is translated or shifted upward a predetermined amount (such as 180 kc.) by the heterodyning oscillator 18, mixer 20 and band pass filter 22 so that any input frequency $f$ (kc.) becomes $180+f$. Channel B is provided with a delay line 24, whereby the signal is delayed in time an amount which may be on the order of 200 microseconds. The signal from each channel is presented to a mixer 26 which performs what may be termed the heterodyne shift correlation by providing a heterodyned frequency difference $(180+f-f=180)$. This 180 kc. signal, which is present only if the input persists for a period longer than the delay time of delay line 24, is passed through filter 28, converted to a suitable audio tone (such as 800 c.p.s.) by heterodyning oscillator 30, mixer 32, and bandpass filter 34 and is aurally presented to the operator through speaker 36. Thus the output signal frequency is always the predetermined audio frequency irrespective of the frequency of the input signal, but the output signal amplitude depends on that of the original signal. If the delay in channels A and B were exactly equal all signals including interfering noise would produce an output signal. However, the additional delay line 24 in channel B tends to prevent the correlation of the broadband noise in the two channels and a new broadband noise is produced by the mixing of the now unrelated noise signals from the two channels. The delay required to prevent correlation of the noise background is inversely proportional to the bandwidth and is 10 microseconds for a 100 kc. band of white noise. A delay value on the order of 200 microseconds is chosen to ensure proper operation under actual noise conditions which differ considerably from the ideal white noise. Additional reduction of noise is effected by bandpass filter 28 which follows mixer 26 and is as narrow as the broadest anticipated signal will allow.

While this method of signal processing provides complete frequency coverage without scanning, frequency information is lost. To provide frequency information, the signal is passed through a second pair of channels C, D. Channel C includes elements 18, 20, 22, 24, a second delay line 38, mixer 40 and filter 42 which is identical with filter 28 while channel D consists of elements 18 through 28. From the output of delay line 24 the signal is passed through delay line 38 to provide a delay on the order of 5 microseconds and fed to mixer 40. The output of filter 22 $(180+f)$ is directly fed to mixer 40 to provide a heterodyned frequency difference output $E_2$ $(180+f-f)$ of 180 kc. The 180 kc. frequency difference output of filter 28 in channel D, $E_1$, is presented with the 180 kc. output $E_2$ of filter 42 to some suitable phase indicating device 44. The difference in phase between signals $E_1$ and $E_2$ is a measure of the frequency of the input signal and the indicator 44 may be so calibrated to read frequency directly.

Where $T$=the delay time of delay line 38, $T_1$=the delay time of delay line 24, and $f$ is the input signal frequency, the phase angle of the input signal is $wt$ and the phase angle of oscillator 18 is $w_1t_1$ the phase angle of $E_1$ is $wt+w_1t_1-w(t+T_1)=w_1t_1-wT_1$ and the phase angle of $E_2$ is $wt+w_1t_1-w(t+T+T_1)=w_1t_1-wT-wT_1$. The difference in the phase angles of $E_1$ and $E_2$ is $(w_1t_1-wT_1)-(w_1t_1-wT-wT_1)=wT$. Therefore the phase difference between $E_1$ and $E_2$ is $wT$ which is $2\pi fT$ or $360fT$ in degrees. Therefore the indicated phase difference in degrees for a 5 microsecond delay is 1.8 times the frequency in kc. of the input signal and a phase shift of from 0 to 180° for a signal input of from 0 to 100 kc. will be indicated.

It will be readily apparent that the operation of this frequency indicator is completely independent of the delay time $T_1$ of delay line 24. As shown in FIG. 2 the principle of this invention may be utilized in a system which simply comprises a pair of channels C', D' connecting a signal source 46 to the phase difference indicator 44. Channel D' feeds the input signal directly to the indicator 44 as $E_1'$ while a known time delay is introduced in channel C' by delay line 38 which feeds the phase shifted signal $E_2'$ to the indicator. In this case the phase angle of $E_1'$ is $wt$ and the phase angle of $E_2'$ is $w(t+T)$. The difference in these phase angles is $wt-w(t+T)=-wT$ which corresponds to the phase angle difference obtained from the circuit of FIG. 1, as above noted.

There are several known methods and devices for indicating the phase difference between a pair of signals and the circuit disclosed in the U.S. patent to Waynick, 2,576,818, is a preferred one of several possibilities. Such a circuit provides an instantaneous visual phase difference display which may be calibrated to read frequency directly. It will yield optimum results with long or short pulses, continuous signals and under conditions of minimum permissible signal to noise ratio.

Another form of apparatus which may be used as the indicator 44 of this invention is the circuitry shown and described by Jordan and Meyers in the Proceedings of the National Electronics Conference, vol. IV, 1948, pp. 468–469 (FIG. 3).

Obviously many modifications and variations of the present invention are possible in the light of the above teachings. It is therefore to be understood that within the scope of the appended claims the invention may be practiced otherwise than as specifically described.

What is claimed is:

1. Apparatus for indicating the frequency of an input signal comprising an input amplifier, means to supply a signal of predetermined frequency, means for heterodyning said input signal with a signal of predetermined frequency, means for mixing said heterodyned signal with said input signal to provide a first output signal at said predetermined frequency, means for delaying said input signal a predetermined amount, means for mixing said delayed signal with said heterodyned signal to provide a second output signal at said predetermined frequency, said output signals having a difference in phase proportional to the frequency of said input signal, and means connected to said mixing means for measuring said difference in phase between said output signals thereby indicating the frequency of said input signal as a function of the phase difference.

2. The apparatus of claim 1 including a second means for delaying the input signal fed from said first mentioned delaying means whereby the delayed signal is fed to the previously mentioned indicating means.

3. In a broad band sonar receiver, an input signal amplifier, a fixed frequency oscillator, mixing means coupled to said amplifier and to said oscillator to provide a heterodyned frequency sum signal, second mixing means coupled to said amplifier and to said first mixing means to provide a heterodyned frequency difference signal at said oscillator frequency, a delay line coupled to said amplifier, third mixing means coupled to said delay line and to said first mixing means to provide a delayed heterodyned frequency difference signal at said oscillator frequency, said first named frequency difference signal and said delayed frequency difference signal having a difference in phase proportional to the frequency of said input signal, and means connected to said second and third mixing means for measuring said phase difference between said frequency difference signals and indicating said input signal frequency.

4. The receiver of claim 3 wherein the coupling between said first named delay line and said third mixing means also includes a second delay line.

5. In a broad band sonar receiver having heterodyning means for shifting a received signal to a first output signal of predetermined frequency, means for delaying the received signal a predetermined time, means for frequency shifting said delayed signal to a second output signal of said predetermined frequency, said first and second output signals having a difference in phase proportional to the frequency of said received signal, and means connected to said shifting means for measuring said phase difference of said first and second output signals whereby the frequency of said received signal may be determined.

6. An apparatus for determining and indicating the frequency of a received input signal comprising in combination a first channel responsive to said input signal having translational heterodyning means for frequency shifting said input signal to a first output signal of predetermined frequency, a second channel responsive to said input signal having means for delaying said input signal a predetermined period of time, correlation means connected to said translation heterodyning means and said signal delaying means for frequency shifting said delayed signal to a second output signal of predetermined frequency, said first and second output signals having a difference in phase proportional to the frequency of said received input signal, and means connected to said input signal frequency shifting means and said delayed signal frequency shifting means for measuring the phase difference of said first and second output signals and indicating same as the frequency of said received input signal.

References Cited in the file of this patent

UNITED STATES PATENTS

| | | |
|---|---|---|
| 649,007 | Steinmetz | May 8, 1900 |
| 1,723,907 | Alexanderson | Aug. 6, 1929 |
| 2,238,129 | Paul | Apr. 15, 1941 |
| 2,434,914 | Earp | Jan. 27, 1948 |
| 2,450,014 | Newitt | Sept. 28, 1948 |
| 2,485,353 | Boosman | Oct. 18, 1949 |
| 2,561,182 | Crane | July 17, 1951 |
| 2,580,148 | Wirkler | Dec. 25, 1951 |
| 2,595,263 | Ingalls | May 6, 1952 |
| 2,704,807 | Wallace | Mar. 22, 1955 |